US007925800B2

(12) United States Patent  
Cheng

(10) Patent No.: US 7,925,800 B2  
(45) Date of Patent: Apr. 12, 2011

(54) METHOD OF EDITING MULTI-MEDIA PLAYING SCHEDULE FOR DIGITAL PHOTO FRAME, SYSTEM AND COMPUTER READABLE STORAGE MEDIUM THEREOF

(75) Inventor: Yao-Sen Cheng, Taipei (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 115 days.

(21) Appl. No.: 12/427,813

(22) Filed: Apr. 22, 2009

(65) Prior Publication Data

US 2009/0282173 A1  Nov. 12, 2009

(30) Foreign Application Priority Data

May 9, 2008  (TW) ................................ 97117277 A

(51) Int. Cl.
*G06F 13/00* (2006.01)
(52) U.S. Cl. ..................... 710/33; 710/6; 710/8; 710/13; 710/17; 710/20; 710/21; 710/34; 710/52; 710/53; 710/57; 710/62
(58) Field of Classification Search .................. 710/6, 8, 710/13, 17, 20, 21, 33, 34, 52, 53, 57, 58, 710/62

See application file for complete search history.

(56) References Cited

U.S. PATENT DOCUMENTS

| 2008/0165290 | A1* | 7/2008 | Li et al. | 348/739 |
| 2008/0250150 | A1* | 10/2008 | Chang | 709/229 |
| 2009/0150592 | A1* | 6/2009 | Kuo et al. | 711/100 |
| 2009/0171970 | A1* | 7/2009 | Keefe | 707/10 |
| 2009/0175133 | A1* | 7/2009 | Jiang | 368/30 |
| 2009/0182800 | A1* | 7/2009 | Lin et al. | 709/201 |
| 2009/0216631 | A1* | 8/2009 | Ahn | 705/14 |
| 2010/0017301 | A1* | 1/2010 | Alva | 705/26 |
| 2010/0088366 | A1* | 4/2010 | Li et al. | 709/203 |

* cited by examiner

*Primary Examiner* — Tariq Hafiz  
*Assistant Examiner* — Jasjit S Vidwan  
(74) *Attorney, Agent, or Firm* — Ming Chow; Sinorica, LLC

(57) ABSTRACT

The present invention discloses a method of editing a multi-media playing schedule for a digital photo frame, a system and a computer readable storage medium thereof, which are characterized in that users can edit a multi-media playing schedule on the data processing apparatus when the digital photo frame is electrically connected to the data processing apparatus, and after editing of the multi-media playing schedule is finished, the multi-media playing schedule is transmitted to the digital photo frame and stored in the digital photo frame. Therefore, the problem of being unable to edit complicated multi-media playing schedules due to simple operation interface of digital photo frames can be solved.

18 Claims, 4 Drawing Sheets

METHOD OF EDITING MULTI-MEDIA PLAYING SCHEDULE FOR DIGITAL PHOTO FRAME, SYSTEM AND COMPUTER READABLE STORAGE MEDIUM THEREOF

BACKGROUND OF THE INVENTION

1. Field of the Invention

The present invention is related to a system of editing a multi-media playing schedule, particularly to the technical field of connecting an external data processing apparatus with a digital photo frame for editing a multi-media playing schedule used in the digital photo frame.

2. Description of the Related Art

Currently, as digital image apparatuses are popularized day by day, more and more users utilize digital cameras and scanners to digitalize various images, so as to facilitate to store in a large amount. Besides, users can share digital images to their relatives and friends via transmitting files or downloading from the internet without being restricted by the distances. The convenience is much better than photos or pictures of conventional media. Digital photo frame is an electronic apparatus capable of displaying digital images, which can read digital image files from the memory card, or connect to the electronic apparatuses which store or provide such digital image files, such as computers, scanners, or digital cameras. Digital photo frame processes the digital image files to convert these files into data which can be processed by display driving module, and displays the digital images on the screen, thereby users don't bother to print images.

Because the main function of digital photo frame is to display digital images, in order to try the best to increase display areas in the limited volume of digital photo frame, to reduce the manufacture cost of digital photo frame, and maintain the beauty of the appearance design of digital photo frame, most digital photo frames don't have complicated operating interfaces. Therefore, conventional digital photo frames only repeatedly play the files stored in the memory card in several preset playing modes.

However, as digital photo frames become more popular, more and more users wish that digital photo frame can provide more playing fun, for example, playing certain images or certain music on special days, or playing images in a special means. However, the operating interface of conventional digital photo frame is too simple for users to edit the multi-media playing schedule of digital photo frame.

SUMMARY OF THE INVENTION

Therefore, one of objectives of the present invention is to provide a system and a method of editing a multi-media playing schedule for a digital photo frame, so as to enhance the convenience of editing a multi-media playing schedule of digital photo frame.

According to the objective of the present invention, a method of editing a multi-media playing schedule for a digital photo frame is provided, and the method comprises the following steps. First, the digital photo frame is connected to a data processing apparatus having an input unit. Next, a schedule editing unit is activated on the data processing apparatus, and the input unit of the data processing apparatus is used to operate the schedule editing unit for editing the multi-media playing schedule. Finally, the multi-media playing schedule is transmitted to the digital photo frame and stored in the digital photo frame.

Preferably, the schedule editing unit can be a software program.

Preferably, the method in accordance with the present invention can further comprise a database which stores at least a multi-media playing schedule template, or at least a multi-media file related to the multi-media playing schedule.

Preferably, the method in accordance with the present invention can further comprise a schedule preview unit for displaying the preview of the multi-media playing schedule on the digital photo frame.

Preferably, the method in accordance with the present invention can further comprise a step of generating a triggering signal in the digital photo frame, and transmitting the triggering signal to the data processing apparatus to activate the schedule editing unit.

Besides, the present invention further discloses a multi-media playing schedule editing system for a digital photo frame, comprising a data processing apparatus, a schedule editing unit, and an input unit. The data processing apparatus is electrically connected to the digital photo frame. The schedule editing unit is installed in the data processing apparatus for editing a multi-media playing schedule. The input unit is installed in the data processing apparatus for operating the schedule editing unit. When the editing of the multi-media playing schedule is finished, the data processing apparatus transmits the multi-media playing schedule to the digital photo frame and the schedule is stored in the digital photo frame.

Preferably, the schedule editing unit can be a software program.

Preferably, the multi-media playing schedule editing system in accordance with the present invention can further comprise a database, which stores at least a multi-media scheduling template, or at least a multi-media file which is related to the multi-media playing schedule.

Preferably, the multi-media playing schedule editing system in accordance with the present invention can further comprise a schedule preview unit for displaying the preview of the multi-media playing schedule on the digital photo frame.

Preferably, the digital photo frame can generate a triggering signal, and then transmit the triggering signal to the data processing apparatus to activate the schedule editing unit.

Besides, the present invention further discloses a computer readable storage medium storing a computer program which is executed for making the computer perform a method of editing a multi-media playing schedule applied to the digital photo frame, and the computer is electrically connected to the digital photo frame, The method of editing the multi-media playing schedule comprises the following steps. First, a multi-media playing schedule editing interface is provided. Next, the playing data of multi-media file to be played on the digital photo frame is inputted through the multi-media playing schedule editing interface. Then, a multi-media playing schedule is generated according to the data inputted on the multi-media playing schedule editing interface. Finally, the multi-media playing schedule is transmitted to the digital photo frame and stored in the digital photo frame.

Preferably, the playing data of the multi-media files contains the playing order, the playing duration, the playing parameter, the playing times value or note words of the multi-media file.

Preferably, this method can further comprise a step of displaying the preview of the multi-media playing schedule on the digital photo frame while editing is proceeding.

Concluding the abovementioned, the system and the method of editing the multi-media playing schedule for a digital photo frame in accordance with the present invention, have following advantages:

(1) The body of digital photo frame is not required to install a complicate operational module for editing a complicate multi-media playing schedule, and it can reduces the manufacture cost of the digital photo frame.

(2) Users can edit a personal multi-media playing schedule more easily, and it can enhance the practicability of the digital photo frame.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

Figure 1:
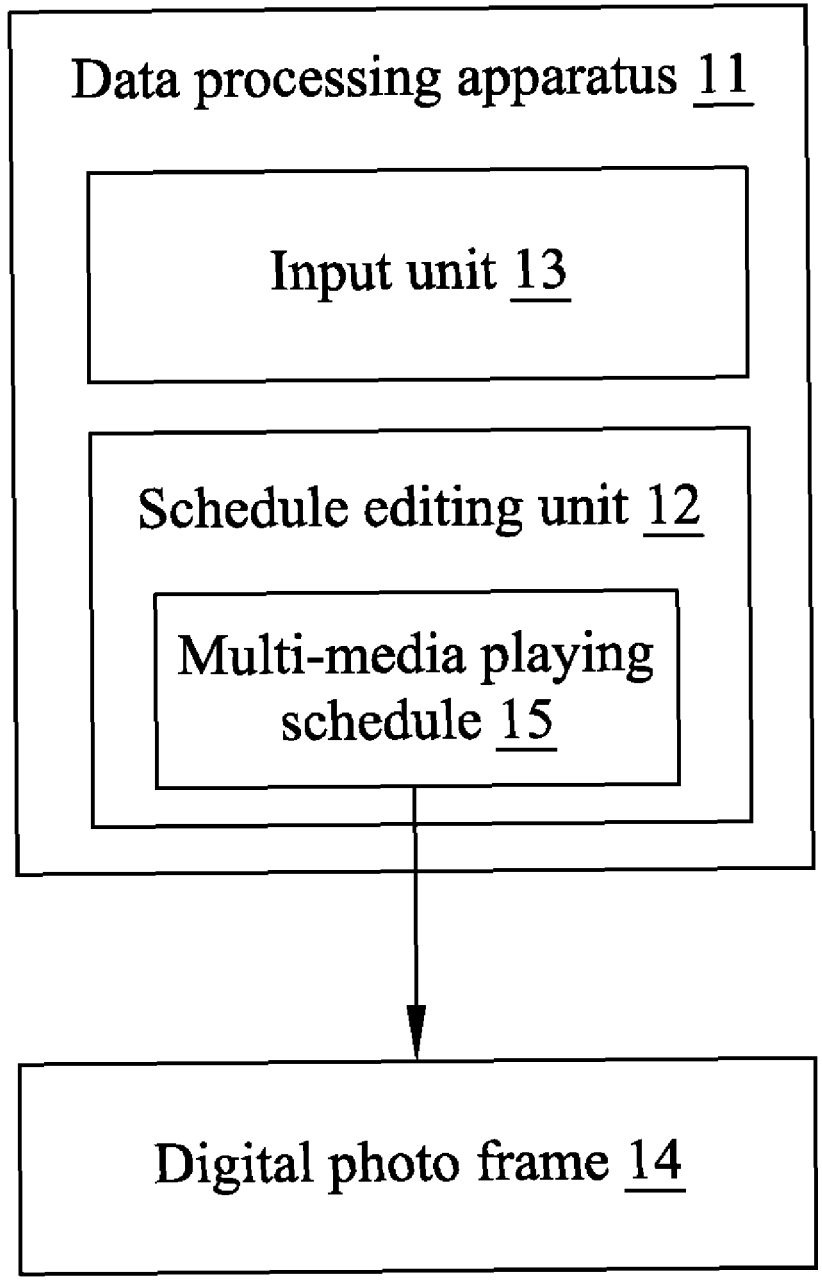
FIG. 1 is a block diagram of a multi-media playing schedule editing system for a digital photo frame in accordance with the present invention.

Please referring to FIG. 1 for a block diagram of a multi-media playing schedule editing system for a digital photo frame in accordance with the present invention, multi-media playing schedule editing system 1 comprises a data processing apparatus 11, a schedule editing unit 12 and an input unit 13. The schedule editing unit 12 is installed on data processing apparatus 11 to edit a multi-media playing schedule 15. Input unit 13 is installed on data processing apparatus 11 to operate schedule editing unit 12. After data processing apparatus 11 is electrically connected to digital photo frame 14, users can manually start the schedule editing unit 12 on data processing apparatus 11 for editing. Otherwise, if digital photo frame 14 has a device capable of generating a triggering signal, such as a key or a touch screen, then users can also trigger this device to generate triggering signal which is then transmitted to data processing apparatus 11 for activating the schedule editing unit 12. Therefore, the convenience of using the multi-media playing schedule editing system of the present invention can be enhanced.

When the multi-media playing schedule 15 is edited completely, the data processing apparatus 11 transmits the multi-media playing schedule 15 to digital photo frame 14 and the multi-media playing schedule 15 is then stored in digital photo frame 14. Besides, while the multi-media playing schedule 15 is transmitted, data processing apparatus 11 can also simultaneously transmit multi-media files related to the multi-media playing schedule 15 to the digital photo frame 14 and store these files in digital photo frame 14. Preferably, the multi-media playing schedule 15 can comprise at least a playing order, a playing duration, a playing parameter, a playing times value, or note words for at least one multi-media file. A playing parameter comprises the effects of fading in and fading out of displayed images, the playing volume, or the brightness of backlight of digital photo frame 14 while the digital photo frame 14 is playing multi-media file.

Digital photo frame 14 can comprise a built-in memory, such as a hard disk or a flash memory, or a memory slot to connect a external memory card. The multi-media playing schedule 15 and the related multi-media files are stored in the built-in memory or the external memory card.

Preferably, data processing apparatus 11 can be a computer, a PDA or an intelligent mobile phone. Input unit 13 is preferred to be keyboard, a mouse, or a touch device which is embedded in data processing apparatus 11 or connected to data processing apparatus 11 from external. Preferably, the schedule editing unit 12 can be a software program executable for data processing apparatus 11, such as a schedule editing program stored in digital photo frame 14 or data processing apparatus 11. The schedule editing program preferably has an auto-run function, and when data processing apparatus 11 detects that the digital photo frame 14 is connected with it, the editing schedule program is executed automatically.

Preferably, multi-media playing schedule editing system 1 can further comprise a file managing unit if necessary. If the capacity of the built-in memory or external memory card is not sufficient to store all of the multi-media files, then the file managing unit stores the multi-media files which will be played within a preset duration, such as two month, in the embedded memory or external memory card in advance based on the multi-media playing schedule. When the digital photo frame 14 is electrically connected to data processing apparatus 11 again, the file managing unit deletes the multi-media file which is played and will not be played anymore within the preset duration, and then downloads the multi-media file which is not stored in the digital photo frame 14 and is going to be played within the preset duration from data processing apparatus 11. Therefore, the application efficiency of the limited storage space of digital photo frame 14 can enhance. The file managing unit is preferred to be a software program, such as a file managing program, which is embedded in the schedule editing program.

Preferably, the multi-media playing schedule editing system 1 can comprise a database. This database stores at least a multi-media scheduling template, or at least a multi-media file for allowing the user to select. The database can be installed in data processing apparatus 11, or on internet. User can download a multi-media scheduling template or a multi-media file from database via internet.

Besides, multi-media playing schedule editing system 1 can further comprise a schedule preview unit for displaying the preview of multi-media playing schedule 15 on digital photo frame 14. Preferably, the schedule preview unit can be a software program, such as a schedule preview program, which is embedded in the schedule editing program as one of the editing function of schedule editing program, or is stored in digital photo frame 14.

Figure 2:
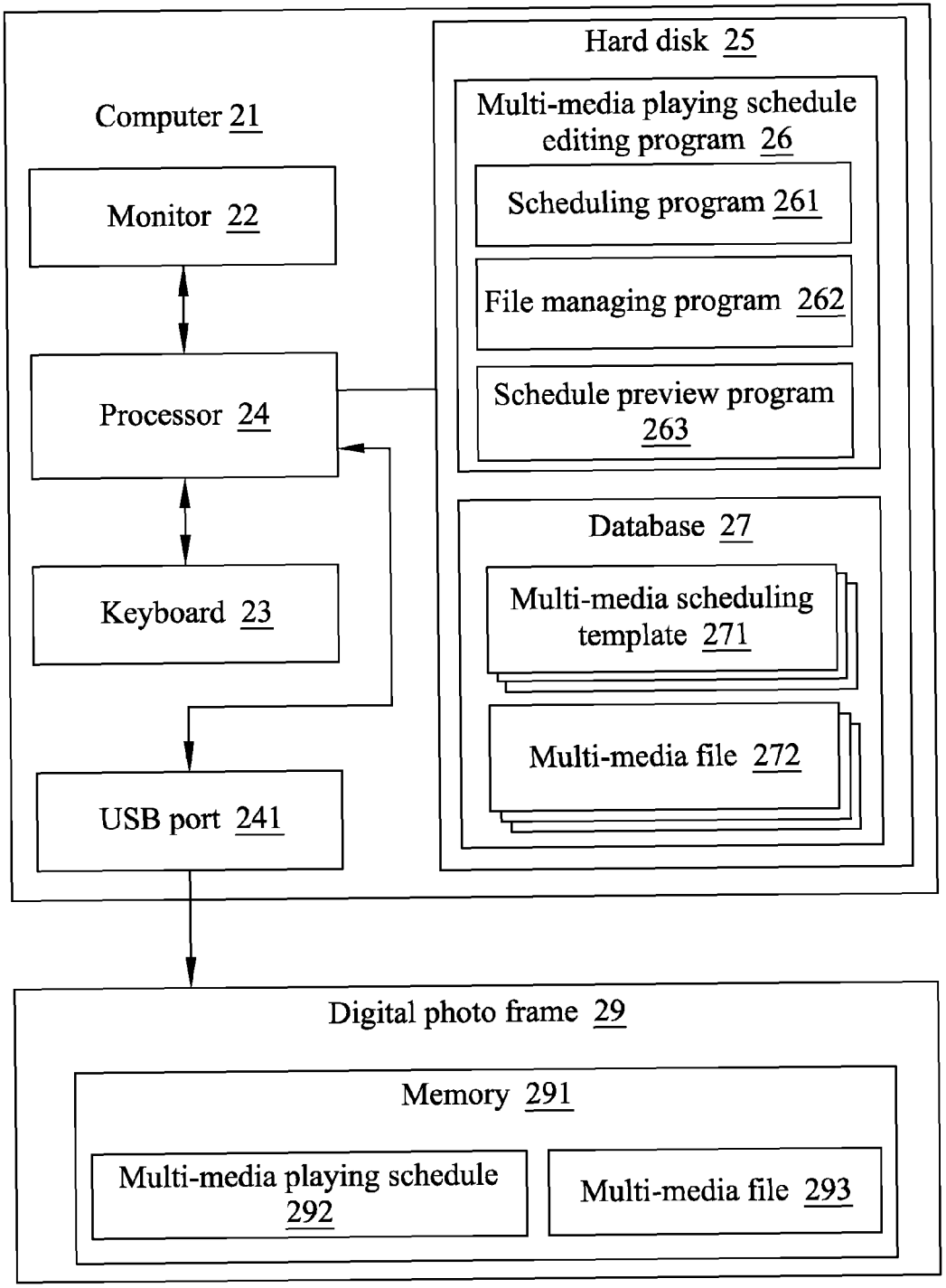
FIG. 2 is a block diagram of an embodiment of multi-media playing schedule editing system for a digital photo frame in accordance with the present invention.

Referring to FIG. 2 for a block diagram of an embodiment of a multi-media playing schedule editing system for the digital photo frame in accordance with the present invention, the multi-media playing schedule editing system is executed in a computer 21 which comprises a monitor 22, a keyboard 23, a processor 24, a USB port 241 and a hard disk 25. Hard disk 25 is for storing a multi-media playing schedule editing program 26 and a database 27. The multi-media playing schedule editing program 26 comprises a scheduling program 261, a file managing program 262 and a schedule preview program 263. Database 27 is for storing plural multi-media files 272 and plural multi-media scheduling templates 271, such as Chinese festivals playing schedule, Western festival playing schedule, Japanese festival playing schedule or personal festival playing schedule. In these templates 271, the schedule is edited with the multi-media files which are played on certain festivals. For example: In the Western festival playing schedule, the image of Santa Claus and Christmas music are set to be played on Dec. 25. The music and images fitting the atmosphere of Valentine's Day will be played on February 14. After choosing a multi-media scheduling template 271, user can then revise the playing data of the multi-media files to be played or change the multi-media file in multi-media scheduling template 271. Therefore, the user can create a personal multi-media schedule more easily.

Figure 3:
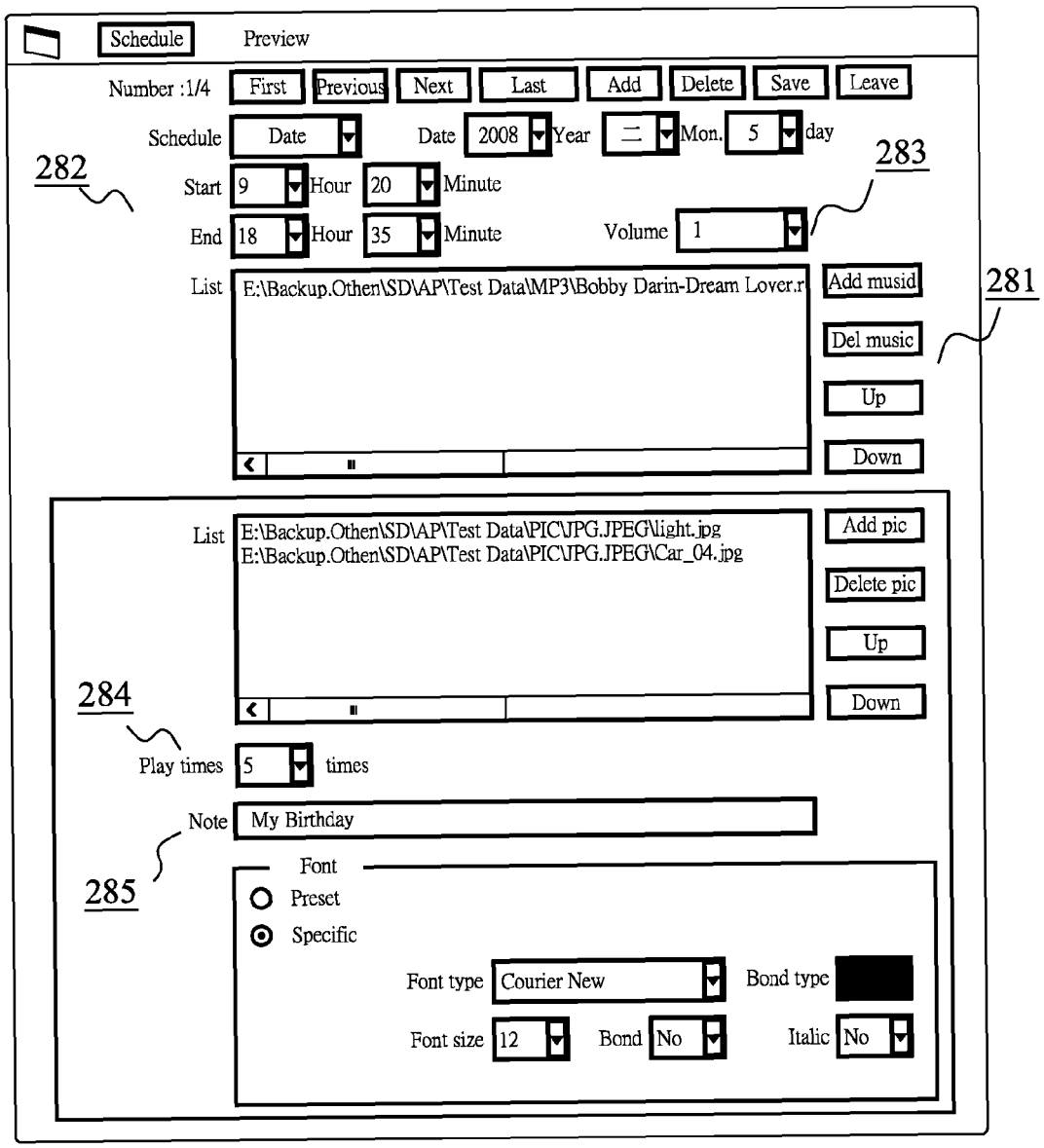
FIG. 3 is a schematic view of an example of multi-media playing schedule editing interface in accordance with the present invention.

When computer 21 is connected to digital photo frame 29 through the USB port 241, the processor 24 reads the multi-media playing schedule editing program 26 from hard disk 25 and executes it, and then drives monitor 22 to display a multi-media playing schedule editing interface 28 of schedule program 261 as shown in FIG. 3. User can use keyboard 23 to operate the multi-media playing schedule editing interface 28 and input data, to edit a multi-media playing schedule 292, for example, to edit playing order 281, playing duration 282, playing parameter 283, playing times value 284 or note words 285 for multi-media file.

After editing is finished, multi-media playing schedule 292 and related multi-media files 293 are transmitted to memory 291 of digital photo frame 29 for storing, and executed by the processor (not shown in the drawing) of digital photo frame 29. The function generated while file managing program 262 and schedule preview program 263 are executed has been described in the former section, and for the sake of brevity, further discussion is omitted.

Preferably, the multi-media playing schedule editing program 26 can be also stored in memory 291 of digital photo frame 29.

Figure 4:
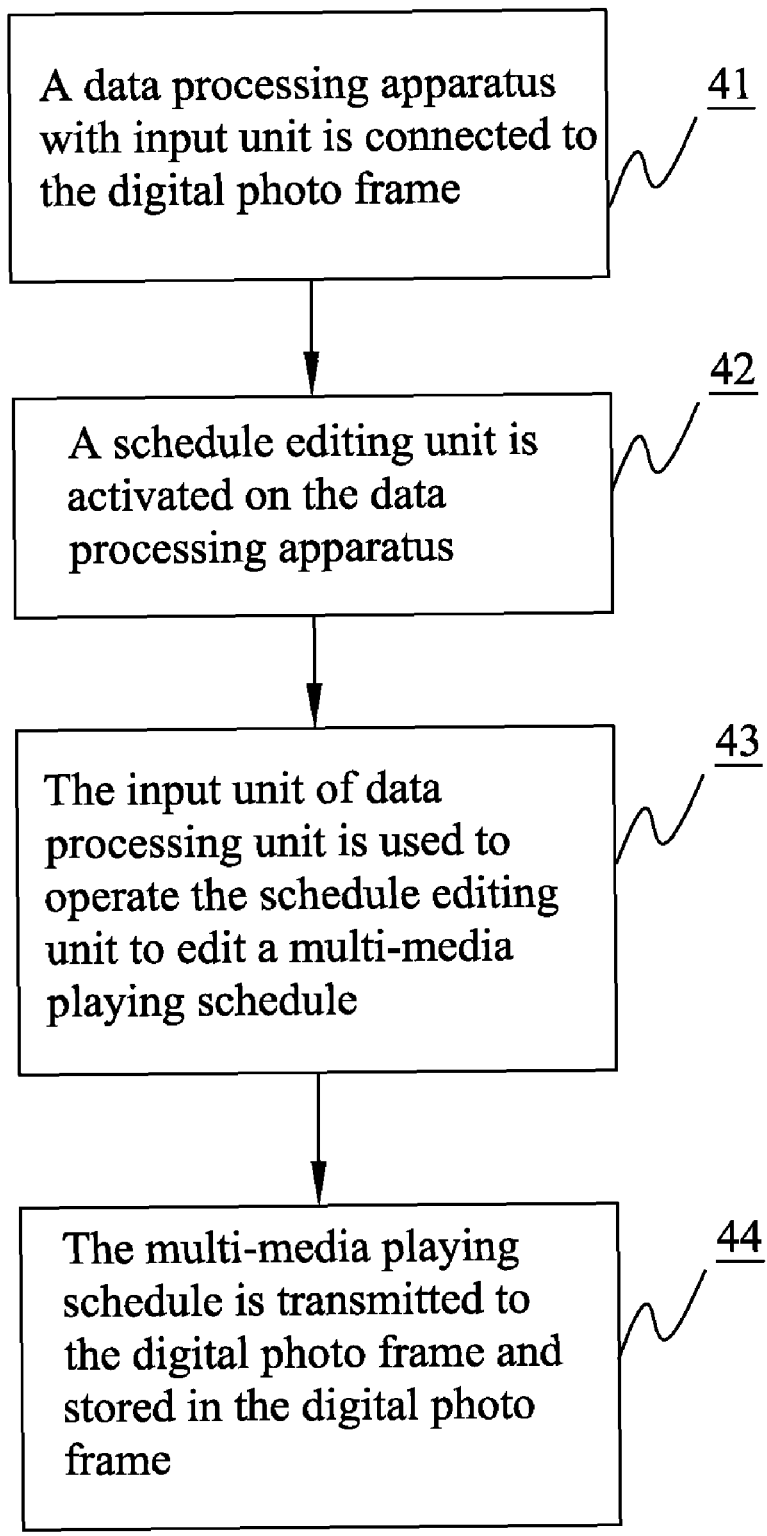
FIG. 4 is a flow chart of the method of editing a multi-media playing schedule for a digital photo frame in accordance with the present invention.

Please referring to FIG. 4 for a flow chart of a method of editing multi-media playing schedule for digital photo frame in accordance with the present invention, the method comprises the following steps. In step 41, a data processing apparatus with input unit is connected to the digital photo frame first. In step 42, a schedule editing unit is activated on the data processing apparatus. This schedule editing unit is preferred to be a software program stored in the data processing unit or the digital photo frame. Preferably, the schedule editing unit can be manually started by users, or a triggering signal which is generated in the digital photo frame and transmitted to data processing unit for activating the schedule editing unit.

In step 43, the input unit of the data processing unit is used to operate the schedule editing unit to edit a multi-media playing schedule. Before step 43 is executed, a database which stores at least one multi-media scheduling template, or at least a multi-media file related to multi-media playing schedule can be provided in advance if necessary. The multi-media playing schedule comprises at least a playing order, a playing duration, a playing parameter, a playing times value or note words for a multi-media file.

After editing is finished, in step 44, the multi-media playing schedule is transmitted to the digital photo frame and stored in the digital photo frame. If the multi-media files related to the multi-media playing schedule have not yet been stored in the digital photo frame, then in step 44 the multi-media files related to the multi-media playing schedule are further transmitted to the digital photo frame and stored in the digital photo frame.

Preferably, in the procedure of editing, a schedule preview unit can be provided for displaying the preview of multi-media playing schedule on the digital photo frame, in order to allow user to preview the playing effect of multi-media playing schedule. This schedule preview unit is preferred to be a software program.

Besides, the multi-media playing schedule editing program can be stored in a computer readable storage medium, such as a hard disk or flash memory. When the computer is electrically connected to the digital photo frame, the multi-media playing schedule editing program can be executed to make the computer perform a method of editing a multi-media playing schedule applied to the digital photo frame. The method comprises the following steps. First, a editing interface of the multi-media playing schedule is provided. And then, the data of multi-media files which are to be played on the digital photo frame are inputted on the multi-media playing schedule editing interface. And then a multi-media playing schedule is generated according to the data inputted on the multi-media playing schedule editing interface. Finally, the multi-media playing schedule is transmitted to the digital photo frame and stored in the digital photo frame.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of editing a multi-media playing schedule for a digital photo frame, comprising the steps of:
   connecting the digital photo frame to a data processing apparatus having an input unit;
   activating a schedule editing unit on the data processing apparatus;
   using the input unit of the data processing apparatus to operate the schedule editing unit to edit a multi-media playing schedule comprising a plurality of multi-media files; and
   transmitting the multi-media playing schedule to the digital photo frame and storing the multi-media playing schedule in the digital photo frame;
   wherein, when a memory of the digital photo frame is insufficient to store all of the plurality of multi-media files, a file managing unit stores some of the plurality of multi-media files played in a preset duration; while the digital photo frame is electrically connected to the data processing apparatus again, the file managing unit deletes the multi-media files having been played and not be played anymore within the preset duration and then downloads the some of the plurality of multi-media files not stored in the digital photo frame and going to play within the preset duration from the data processing apparatus.

2. The method of claim 1, wherein the schedule editing unit can be a software program.

3. The method of claim 1, wherein the data processing apparatus can be a computer, a PDA or an intelligent mobile phone.

4. The method of claim 1, wherein the input unit can be a keyboard, a mouse or a touch apparatus.

5. The method of claim 1, further comprising a step of:
   providing a database which stores at least a multi-media playing schedule template, or at least a multi-media file related to the multi-media playing schedule.

6. The method of claim 1, further comprising a step of:
   providing a schedule preview unit for displaying the preview of the multi-media playing schedule on the digital photo frame.

7. The method of claim 1, further comprising a step of:
generating a triggering signal in the digital photo frame, and transmitting the triggering signal to the data processing apparatus to activate the schedule editing unit.

8. The method of claim 1, wherein the multi-media playing schedule comprises at least a playing order, a playing duration, a playing parameter, a playing times value or note words for at least one multi-media file.

9. A multi-media playing schedule editing system for a digital photo frame, comprising:
a data processing apparatus electrically connected to the digital photo frame;
a schedule editing unit installed on the data processing apparatus for editing a multi-media playing schedule comprising a plurality of multi-medial files;
an input unit installed on the data processing apparatus for operating the schedule editing unit; and
a file managing unit installed in the data processing apparatus;
wherein, the data processor transmits the multi-media playing schedule to the digital photo frame, and the multi-media playing schedule is stored in digital photo frame after the editing of the multi-media playing schedule is finished; when a memory of the digital photo frame is insufficient to store all of the plurality of multi-media files, the file managing unit stores some of the plurality of multi-media files played in a preset duration; while the digital photo frame is electrically connected to the data processing apparatus again, the file managing unit deletes the multi-media files having been played and not be played anymore within the preset duration and then downloads the some of the plurality of multi-media files not stored in the digital photo frame and going to play within the preset duration from the data processing apparatus.

10. The multi-media playing schedule editing system of claim 9, wherein the schedule editing unit can be a software program.

11. The multi-media playing schedule editing system of claim 9, wherein the data processing apparatus can be a computer, a PDA, or an intelligent mobile phone.

12. The multi-media playing schedule editing system of claim 9, wherein the input unit can be a keyboard, a mouse or a touch apparatus.

13. The multi-media playing schedule editing system of claim 9, further comprising a database which stores at least a multi-media playing schedule template, or at least a multi-media file related to the multi-media playing schedule.

14. The multi-media playing schedule editing system of claim 9, further comprising a schedule preview unit for displaying the preview of the multi-media playing schedule on the digital photo frame.

15. The multi-media playing schedule editing system of claim 9, wherein the multi-media playing schedule contains at least a playing order, a playing duration, a playing parameter, a playing times value or note words for at least one multi-media file.

16. A computer readable storage medium storing a computer program which is executed for making the computer perform a method of editing a multi-media playing schedule applied to the digital photo frame, and the computer being electrically connected to the digital photo frame, the method of editing the multi-media playing schedule comprising the following steps of:
providing a multi-media playing schedule editing interface;
inputting the playing data of multi-media files to be played on the digital photo frame through the multi-media playing schedule editing interface;
generating a multi-media playing schedule according to the data inputted on the multi-media playing schedule editing interface; and
transmitting the multi-media playing schedule to the digital photo frame and storing the multi-media playing schedule in the digital photo frame;
wherein, when a memory of the digital photo frame is insufficient to store all of the multi-media files, a file managing unit installed in the computer stores some of the multi-media files played in a preset duration; while the digital photo frame is electrically connected to the computer again, the file managing unit deletes the multi-media files having been played and not be played anymore within the preset duration and then downloads the some of the multi-media files not stored in the digital photo frame and going to play within the preset duration from the data processing apparatus.

17. The computer readable storage medium of claim 16, wherein the playing data can contain a playing order, a playing duration, a playing parameter, a playing times value or note words of the multi-media file.

18. The computer readable storage medium of claim 16, wherein the method further comprising a step of displaying the preview of the multi-media playing schedule on the digital photo frame while editing is proceeding.

* * * * *